United States Patent [19]

Breen

[11] Patent Number: 5,348,274
[45] Date of Patent: Sep. 20, 1994

[54] ELECTRICAL OUTLET BOX LOCATOR

[76] Inventor: Thomas Breen, R.D. #1, Wiley Rd., Savannah, N.Y. 13146

[21] Appl. No.: 92,396

[22] Filed: Jul. 15, 1993

[51] Int. Cl.$^5$ ............................................. B25B 1/20
[52] U.S. Cl. ..................................... 269/3; 269/43; 269/904; 33/613; 33/DIG. 10
[58] Field of Search ..................... 33/613, DIG. 10; 269/904, 6, 43; 29/281.5

[56] References Cited

U.S. PATENT DOCUMENTS

| 2,962,281 | 11/1060 | Hodgson . |
| 2,990,172 | 6/1961 | Gianotta ........................ 33/DIG. 10 |
| 3,154,304 | 10/1964 | Crawford ........................ 33/DIG. 10 |
| 4,479,639 | 10/1984 | Kane . |
| 4,832,297 | 5/1989 | Carpenter . |
| 4,850,115 | 7/1989 | Price et al. . |
| 4,888,879 | 12/1989 | Dixon . |
| 5,067,247 | 11/1991 | Milichichi et al. ........... 33/DIG. 10 |
| 5,072,523 | 12/1991 | Bennett . |

Primary Examiner—Robert C. Watson
Attorney, Agent, or Firm—Harris Beach & Wilcox

[57] ABSTRACT

Apparatus for locating an electrical outlet box to either side of a vertical wall stud in which the box is accurately registered without benefit of complex adjusting mechanism.

6 Claims, 3 Drawing Sheets

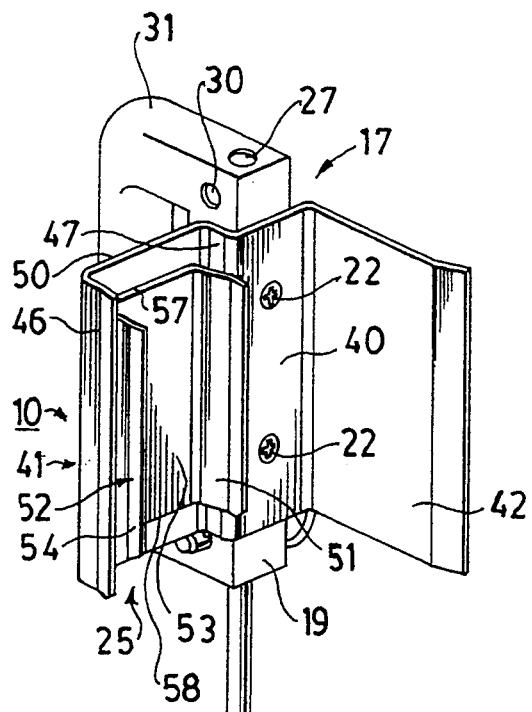
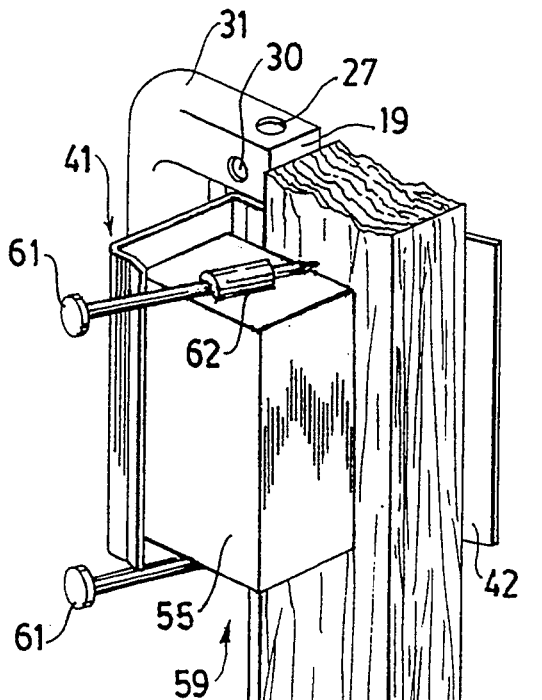
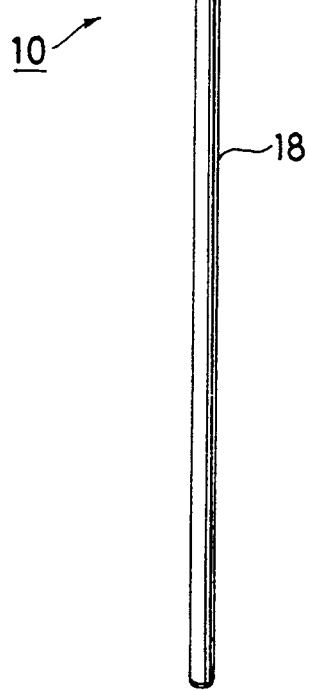
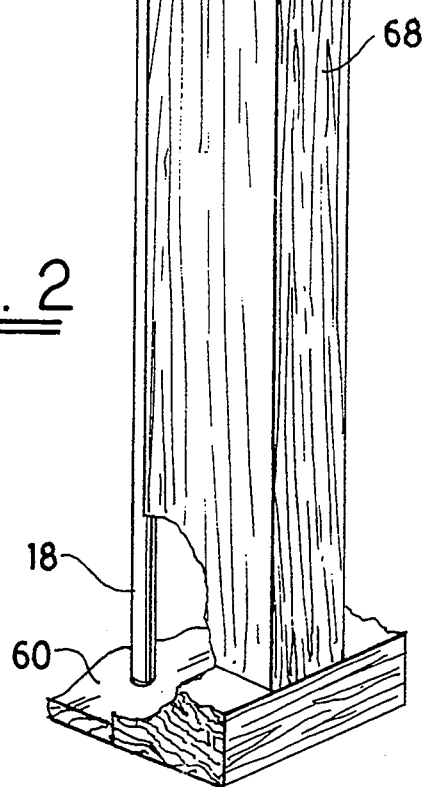
FIG. 1
FIG. 2

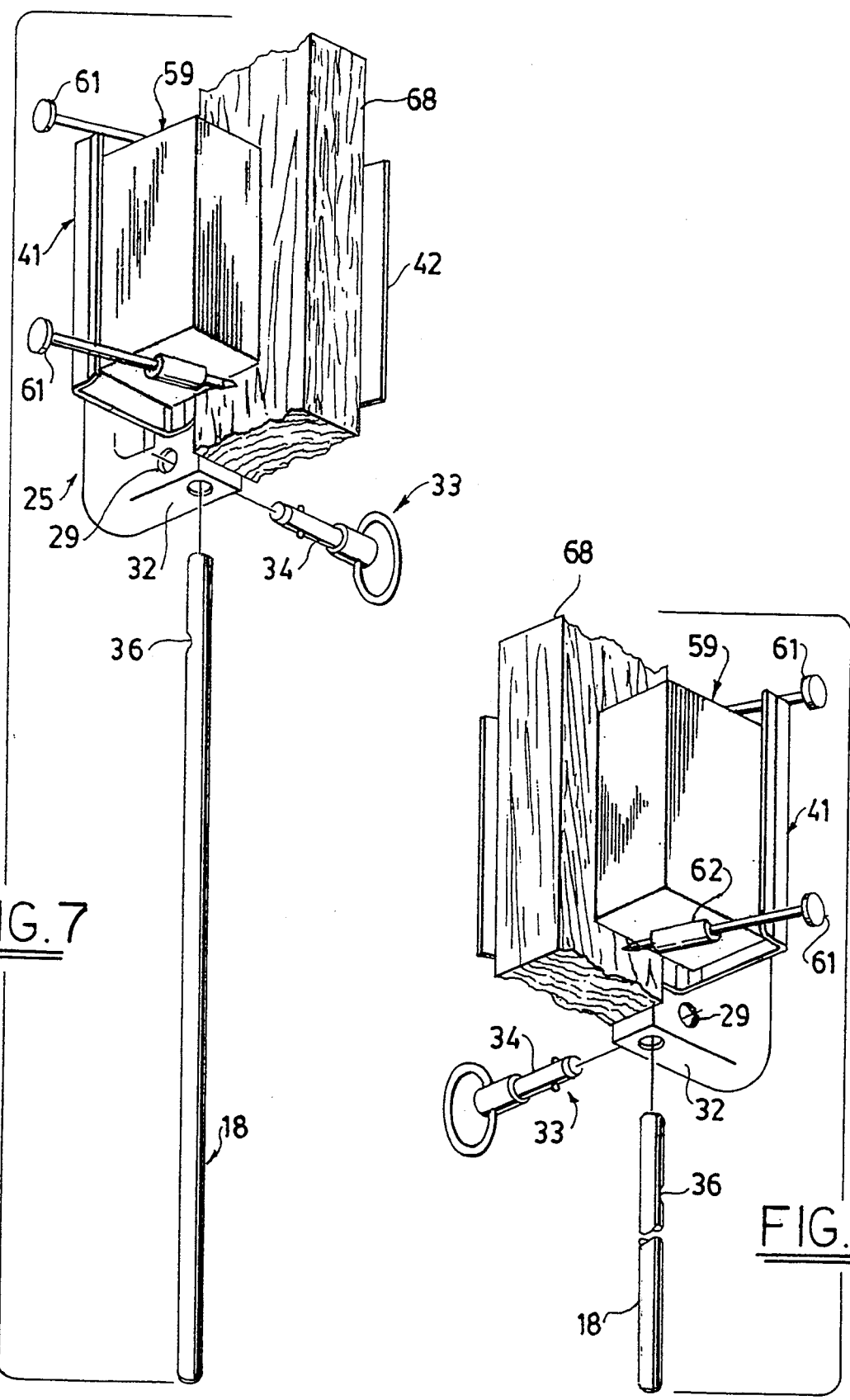

ELECTRICAL OUTLET BOX LOCATOR

BACKGROUND OF THE INVENTION

This invention relates to apparatus for accurately positioning an electrical outlet box adjacent to a vertically disposed stud whereby electrical outlet boxes can be uniformly installed throughout a building on either side of the building wall studs.

A number of electrical outlet box locators are known and used in the art which are designed to locate an outlet box adjacent to a wall stud prior to securing the box to the stud. Some of these devices such as those depicted in U.S. Pat. Nos. 4,850,115 and 4,479,639 are rather complex and require a good deal of adjusting before they can be put into use. If the adjusting mechanism falls out of adjustment during installation of the outlet boxes, the boxes will be misset and most likely have to be removed and reset. Removal and resetting of the outlet boxes can be a costly and time consuming procedure.

An electrical outlet box mounting tool is also disclosed in U.S. Pat. No. 5,072,523. The device described in this patent employs a relatively heavy support column having slotted holes for slidably receiving therein one side wall of an electrical outlet box. The heavy column is not only difficult to transport and store, but also provides a rather unstable means for supporting the outlet box during installation. Here again, the box can become easily misaligned within the slotted holes and thus be installed at the wrong depth or in a tipped position. An outlet set at the wrong depth or in a tipped position generally is not discovered until such time as the wall board is installed. To correct the situation, the wall board must be removed and the outlet box reset. Most wall boards in use today cannot be removed without totally destroying the board, which again, can make resetting of the outlet costly.

U.S. Pat. No. 4,888,879 involves a hand-held device for locating electrical outlet boxes on either side of a wall stud. The device further includes a number of threaded adjusting members that can easily become loosened and fall out of adjustment. The device includes a central support block for engaging a stud and a pair of spring members protruding to either side of the block, each of which can support an outlet box. The open face of the outlet box is slipped over a selected one of the springs, depending upon which side of the stud the box is to be positioned, and the block then spaced against the face of the stud. A vertical rod is used to position the device at a desired elevation. However, because of the loose connection afforded between the spring holding member and the outlet box, it is difficult to maintain the box at a location for installation.

OBJECTS AND SUMMARY OF THE INVENTION

It is therefore an object of the present invention to improve apparatus for locating an electrical outlet box in reference to a wall stud.

A further object of the present invention is to provide an electrical outlet box locating device that is capable of securely supporting the box in accurate registration therein so that the box can be affixed to either side of a wall stud at a desired elevation and depth with regard to the stud.

A still further object of the present invention is to provide a device for accurately locating an electrical outlet box in reference to a wall stud that has no adjustable parts that might become misaligned or fall out of adjustment.

Another object of the present invention is to provide apparatus for accurately locating an electrical outlet box in reference to a wall stud that is lightweight, easily portable, and can be conveniently stored in a tool box or the like.

These and other objects of the present invention are attained by means of apparatus for accurately positioning an electrical outlet box in reference to a wall stud so that a series of outlet boxes can be set at a uniform elevation and depth with reference to the stud within a building that is under construction or being renovated. The apparatus includes a handle unit having a flat front surface. A plate is secured to the front surface of the handle which has an integral channel shaped section located on one side thereof and a stud engaging wall that extends outwardly from the other side of the plate. A clamping device is mounted in the channel section that has a pair of arms for releasably engaging the inner side walls of an outlet box. The clamping device contains a back wall against which the open front face of the outlet box is seated. The vertical height of the clamping device is equal to the height of the box opening whereby the box can be registered within the clamping device. A rod is locked by means of a detent pin into a vertical hole formed in the handle.

In use, an outlet box is seated securely into the clamping device with its front face in contact with the rear wall of the channel shaped section. The interior surfaces of the top and bottom walls of the box are then brought into registration with the top and bottom surfaces of the clamping device. The rod is next placed on the flooring adjacent a stud, and the front wall and one side wall of the stud are then registered against the front face of the plate and its extended side wall. This accurately locates and firmly positions the outlet box against the other side wall of the stud so that it can be accurately affixed thereto at the desired elevation and depth in regard to the stud.

BRIEF DESCRIPTION OF THE DRAWINGS

For a better understanding of these and other objects of the present invention, reference shall be made to the following detailed description of the invention which is to be read in association with the accompanying drawing, wherein:

FIG. 1 is a perspective view of apparatus embodying the teachings of the present invention for positioning an electrical outlet box adjacent to a wall stud;

FIG. 2 is a perspective view of the apparatus shown in FIG. 1 showing an electrical outlet box mounted therein registered in position adjacent to a wall stud;

FIG. 7 is an exploded partial view showing an electrical outlet box mounted in the apparatus of the present invention with an electrical outlet box positioned adjacent to one side of a wall stud; and FIG. 8 is an exploded view in perspective similar to FIG. 7 showing the electrical outlet box positioned adjacent to the other side of the stud.

DETAILED DESCRIPTION OF THE INVENTION

Figure 3:
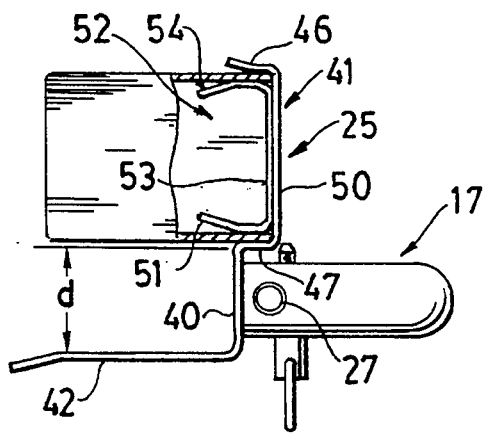
FIG. 3 is a top view of the apparatus shown in FIG. 1.

Referring initially to FIGS. 1 and 2 there is shown locating apparatus generally referenced 10 for quickly and accurately locating an electrical outlet box 59 adjacent to one side wall 13 of a vertical stud 68. As will be explained in greater detail below, the present apparatus can be quickly adapted to locate the outlet box to either side of a stud without modification or major adjustment of the apparatus. The present apparatus includes two main sections, a handle unit 17 that is slidably connected to a cylindrical, elongated rod 18. The rod is removably secured to the handle by means of a detent pin 33.

With further reference to FIGS. 3–8, the handle unit 17 includes a locating block 12 having a flat front face 19 and a hand grip 20 extending rearwardly from the block. A contoured support plate, generally referenced 25, is secured by threaded fasteners 22-22 (FIG. 1) to the front face of the locating block. The locating block contains an aperture 27 that passes vertically between the top and bottom surfaces of the block. The aperture is adapted to slidably receive therein the cylindrical elongated rod 18. Pin receiving holes 29 and 30 are passed horizontally through the locating block adjacent to the top and bottom surfaces 31 and 32, respectively, of the block. The horizontally disposed holes pass partially through the back of the vertical aperture and are adapted to permit a detent pin 33 to pass through the block so that a portion of the pin shank 34 (FIG. 8) resides in the aperture opening.

The detent pin functions to box index the rod within the locating block of the handle unit and to lock the block to the rod 18. As illustrated in FIGS. 7 and 8, the upper portion of the rod is provided with an arcuate shaped groove 36 that complements the shape of the detent pin shank. As can be seen, when the upper part of the rod is inserted in the vertical aperture through the bottom wall of locating block, the groove can be aligned with the lower detent receiving hole 29, thus permitting the pin to pass freely through the block. This, in turn, positions the handle a given distance above the distal end of the rod.

The detent pin can be removed and the handle unit inverted on the rod by inserting the top portion of the rod into the aperture through the top surface 31 of the locating block. Here again, the groove 36 is aligned with hole 30 and the pin reinserted to lock the handle to the rod. As will be explained in greater detail below, inverting the handle unit on the rod as described enables the user to position an electrical box secured in the apparatus on one side or the other of a vertical wall stud 68. The contoured support plate 25 is symmetrically located about the horizontal axis of handle unit 17 so that the plate's position relative to the distal tip of the rod will remain constant when the handle is inverted on the rod.

Alternatively, the vertical aperture 27, which passes completely through the body of the handle unit can be replaced by a pair of blind holes passing inwardly from the top and bottom walls of the unit. The depth of the blind holes can be controlled so that the groove in the rod is automatically aligned with an associated horizontal hole when the rod is bottomed in the blind hole. It is then a relatively simple task to pass the shank of the detent pin through the groove and thus lock, the rod to the handle unit.

The contoured support plate 25, contains three distinct integral sections. These include a flat center section 40, a channel shaped section 41 and stud engaging wall section 42. The center section 40 is secured by the previously noted threaded fasteners to the vertical front face 19 of the locating block 12. The central section extends laterally to either side of the block. A channel shaped section 41 is integrally joined along one side edge of the center section and a stud engaging wall section 42 is similarly joined along the opposite side edge of the center section.

The channel section of the locating plate contains a pair of side walls 46 and 47 and a back wall 50 that is parallel with the front face of the handle and located a predetermined distance c back from the front face. A clip member 52 is seated inside the channel section with a back wall 53 of the clip member being secured by any suitable means to the back wall 50 of the channel section. The back wall 53 includes a top edge 57 and a bottom edge 58. For conveniently and clearly describing the present invention, the various directional references used herein are taken relative to the reference frame of the drawing, it being understood that in actual use of the present apparatus, relative directional references may be inverted or reversed. The clip member has two raised clamping arms 54 and 51 attached to the back wall 53 that are adapted to engage in biasing contact the inside surfaces of the opposing side walls 55 and 56 of an outlet box 59 (FIG. 6) that is inserted therebetween. The vertical length of the clamping arms and the back wall of the clip members are equal to the interior height of a conventional electrical outlet box. As a result, a box can be quickly registered in the device by simply inserting it into the clamping member with the open front face of the box facing the rear wall of the channel section. The box can be easily moved horizontally over the arms into contact against the rear wall of the channel section which will place the top and bottom walls of the box flush with the top and bottom surfaces of the clip member.

The wall section of the plate 25 is connected to the opposite side of the center section of that plate and extends forward of the handle unit at right angles to the center section. As illustrated in FIG. 3, the horizontal distance d across the center section of the plate as measured from the inside of the wall section and the outside of the channel section is equal to that of a normal wooden stud used in the construction of a building which in most cases is a 2×4 member.

Figure 6:
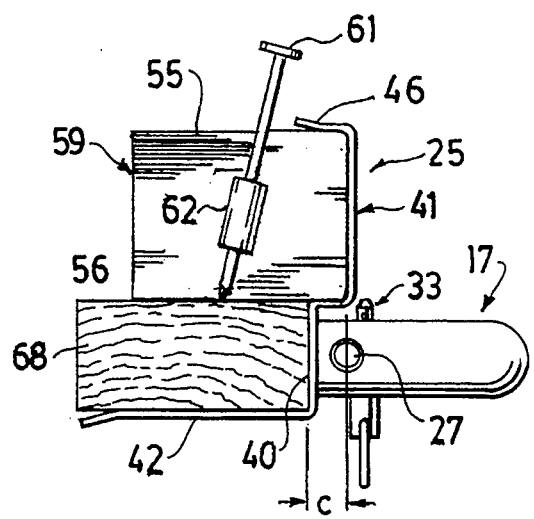
FIG. 6 is a top view showing an electrical outlet box mounted in the apparatus of the present invention in registration with one side of a wall stud.
Figure 4:
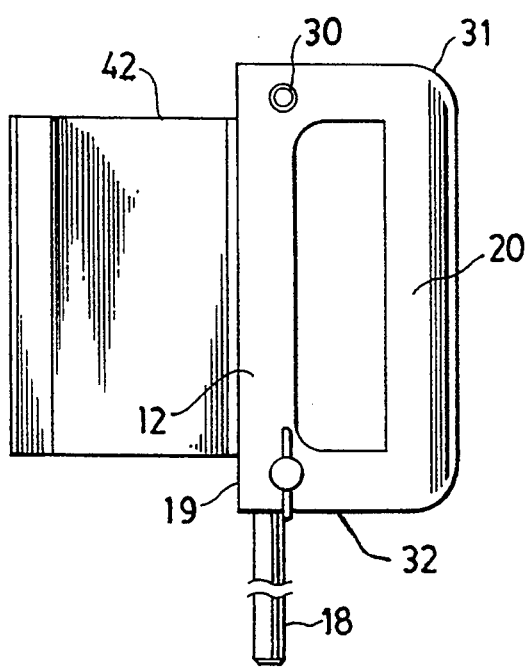
FIG. 4 is a partial front elevation of the apparatus shown in FIG. 1.
Figure 5:
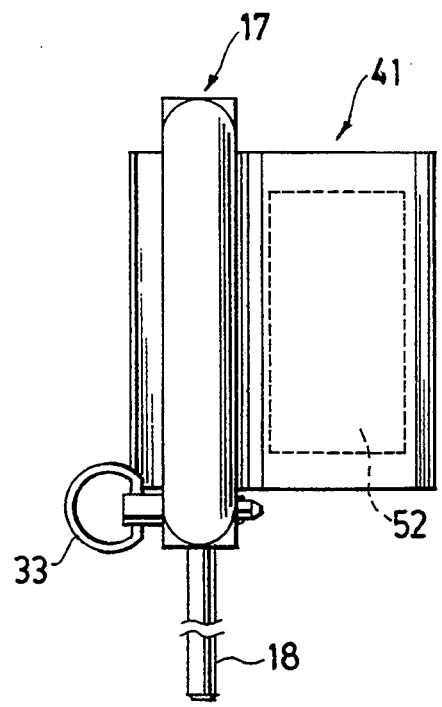
FIG. 5 is a partial rear elevation of the apparatus shown in FIG. 1.

In use, the handle unit is connected to the rod as explained above to locate an electrical box on the desired side of a stud and the box is registered in the clip member. The flat center of the center section of the plate is then placed in contact against the front wall of the stud and the distal end of the rod is rested upon the floor or subfloor 60 (FIG. 2) supporting the stud. The wall section of the plate is also seated against the adjacent side wall of the stud thus locating the electrical box adjacent the opposite side wall of the stud, as shown in FIG. 6.

As can be seen by design the front face of the box protrudes outwardly from the front wall of the stud a predetermined distance C (FIG. 6) which is equal to the thickness of the wall board which will ultimately be secured to the front face of the stud. Accordingly, the front face of the box will be flush with the outer wall surface when the wall board is installed.

As previously pointed out in reference to FIGS. 7 and 8, the handle unit 17 can be quickly and conveniently reversed on the rod 18 so that an outlet box registered in the clip member can be located on one side or the other of a stud. The present apparatus can be converted without the need of further adjustment or modification of the device. Most outlet boxes are furnished with nails 61-61 that are slidably contained within holders 62. With the box located adjacent the desired side of a stud, the nails are fully accessible and it is a simple task for the installer to fasten the box to the stud. As can be seen, the apparatus of the present invention can be utilized to properly locate outlet boxes at a uniform height to exposed studs throughout a new building under construction or in an older building that is being renovated. By simply reversing the handle upon the rod, the present apparatus can be quickly and accurately converted without major adjustment for use in locating outlet boxes on one side or the other of the exposed studs. It should be further noted that the handle unit is easily separated from the rod for ease of transporting and storage. The apparatus furthermore does not contain any sensitive adjustable mechanisms which can render inoperative through mishandling or which can become misaligned during use.

While this invention has been explained with reference to the structure disclosed herein, it is not confined to the details set forth and this invention is intended to cover any modifications and changes as may come within the scope of the following claims.

What is claimed is:

1. An apparatus for locating and positioning an electrical outlet box adjacent a vertical wall stud having an exposed front surface upon which wall board is to be affixed, said apparatus comprising:
    handle means having a flat vertically disposed front face and hand grippable means,
    a plate having a vertically disposed flat section being secured to the front face of said handle means;
    said plate including a channel shaped section rearwardly extended from one side of said flat section having parallel inner and outer side walls each being perpendicularly aligned with said flat section and a back wall being in parallel alignment with said flat section;
    said plate further including a stud engaging wall section extending forwardly from the other side of said plate and being in parallel alignment with the inner wall of said channel section and separated therefrom a distance about equal to the width of the wall stud;
    clamping means mounted inside said channel section having parallel arms supported by a back plate with a top and bottom edge extending between the arms, said parallel arms being arranged to move into biasing contact against the interior side wall surfaces of an electrical outlet box, said clamping means for releasably retaining the side walls of said electrical outlet box between said parallel arms so that the interior top and bottom wall surfaces of the box come into registration, respectively, with the top and bottom edges of said back plate when the box is fully inserted into said clamping means; and
    elongated support means of a predetermined length being removably attached to said handle means and vertically disposed thereto for locating said fully inserted electrical outlet box in a predetermined location relative to said vertical wall stud.

2. The apparatus of claim 1 wherein said elongated support means is a rod that is slidably received within a hole that passes vertically through said handle means.

3. The apparatus of claim 2 wherein said rod is selectively insertable into said hole through top and bottom surfaces of said handle means.

4. The apparatus of claim 3 that further includes indexing means for accurately locating the rod within the handle means in relation to either said top or said bottom surfaces of said handle mans.

5. The apparatus of claim 1 wherein the stud engaging wall section of the plate includes a laterally turned lip at the outwardly extended distal end of said wall section for directing a stud into sliding contact with said wall section.

6. The apparatus of claim 1 wherein the vertical length of said parallel arms is approximately equal to the inside height of said electrical outlet box between the top and bottom wall surfaces of the box whereby the box is retained against vertical movement when placed upon the arms.

* * * * *